United States Patent
Asada

(10) Patent No.: US 6,778,842 B2
(45) Date of Patent: Aug. 17, 2004

(54) PORTABLE TELEPHONE AND DATA COMMUNICATION CONTROL METHOD FOR PORTABLE TELEPHONE

(75) Inventor: Hideaki Asada, Tokyo (JP)

(73) Assignee: NEC Corporation, Tokyo (JP)

( * ) Notice: Subject to any disclaimer, the term of this patent is extended or adjusted under 35 U.S.C. 154(b) by 425 days.

(21) Appl. No.: 10/003,299

(22) Filed: Dec. 6, 2001

(65) Prior Publication Data

US 2002/0072397 A1 Jun. 13, 2002

(30) Foreign Application Priority Data

Dec. 12, 2000 (JP) ........................................ 2000-377352

(51) Int. Cl.[7] .......................... H04M 1/00; H04B 17/00; H04J 1/02
(52) U.S. Cl. ................. 455/552.1; 455/553.1; 455/556.2; 455/115.1; 455/115.3; 370/230; 370/493; 379/265.09
(58) Field of Search ............................ 455/552.1, 553.1, 455/556.1, 556.2, 557, 115.1, 115.3, 450, 452.21, 509, 510, 513, 550; 379/265.06, 265.09, 1.01, 1.03, 1.04, 22; 370/493, 494, 495, 230

(56) References Cited

U.S. PATENT DOCUMENTS

| | | | |
|---|---|---|---|
| 4,740,794 A | 4/1988 | Phillips et al. | |
| 5,335,366 A | 8/1994 | Daniels | |
| 5,493,704 A | 2/1996 | Grangeat et al. | |
| 5,901,202 A | * 5/1999 | Lam | ............................. 379/22 |
| 6,259,785 B1 | * 7/2001 | Shaffer et al. | ......... 379/265.02 |
| 6,510,324 B2 | * 1/2003 | Fukumura | ................. 455/550.1 |
| 2003/0198205 A1 | * 10/2003 | Uebayashi et al. | ......... 370/335 |

FOREIGN PATENT DOCUMENTS

| | | |
|---|---|---|
| EP | 0 508 299 A1 | 10/1992 |
| JP | 1-318438 A | 12/1989 |

\* cited by examiner

Primary Examiner—Duc M. Nguyen
(74) Attorney, Agent, or Firm—Sughrue Mion, PLLC

(57) ABSTRACT

A portable telephone includes a speech transmission circuit, data transmission circuit, earphone/microphone detection circuit, and control circuit. The speech transmission circuit performs speech communication through an antenna. The data transmission circuit performs data communication through the antenna simultaneously with speech communication by the speech transmission circuit. The earphone/microphone detection circuit detects an obstacle that causes a deterioration in transmission efficiency of the antenna. When one of a data communication request during speech communication and a speech communication request during data communication is generated, the control circuit 11 determines on the basis of a detection result obtained by the detection circuit whether to permit/reject the request. A data communication control method for the portable telephone is also disclosed.

10 Claims, 3 Drawing Sheets

PORTABLE TELEPHONE AND DATA COMMUNICATION CONTROL METHOD FOR PORTABLE TELEPHONE

BACKGROUND OF THE INVENTION

The present invention relates to a portable telephone capable of simultaneously performing telephone conversation (speech communication) and data communication and a data communication control method for the portable telephone.

In general, if an obstacle such as the head of the user of a portable telephone exists near the antenna, the transmission efficiency of the antenna deteriorates. For this reason, in a portable telephone having a multi-call function capable of simultaneously performing telephone conversation and data communication, a deterioration in communication quality occurs due to a deterioration in the transmission efficiency of the antenna during high-speed data communication, in particular. Conventionally, to prevent such a deterioration in communication quality, high communication quality is ensured by increasing the transmission power of a portable telephone.

If, however, the transmission power of the portable telephone is increased to keep the quality of data communication high, the current consumption increases resulting in various problems. Under the circumstances, it is required to suppress an increase in transmission power.

SUMMARY OF THE INVENTION

It is an object of the present invention to provide a portable telephone which suppresses an increase in transmission power when speech communication and data communication are simultaneously performed.

In order to achieve the above object, according to the present invention, there is provided a portable telephone comprising speech transmission means for performing speech communication through an antenna, data transmission means for performing data communication through the antenna simultaneously with speech communication by the speech transmission means, detection means for detecting an obstacle that causes a deterioration in transmission efficiency of the antenna, and control means for, when one of a data communication request during speech communication and a speech communication request during data communication is generated, determining on the basis of a detection result obtained by the detection means whether to permit/reject the request.

DESCRIPTION OF THE PREFERRED EMBODIMENTS

The present invention will be described in detail below with reference to the accompanying drawings.

Figure 1:
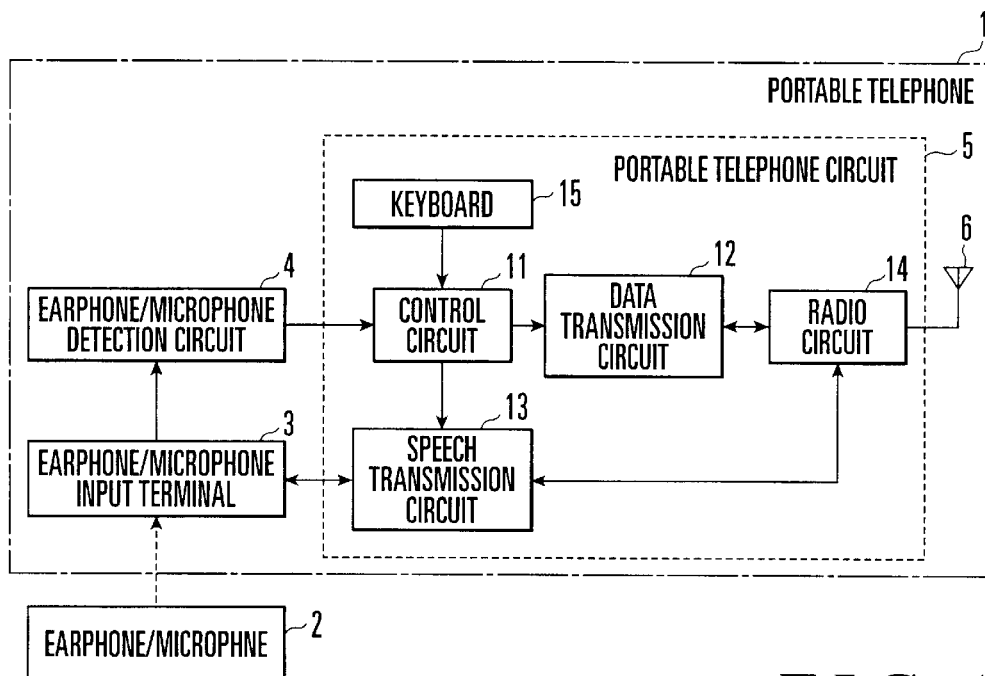
FIG. 1 is a block diagram showing a portable telephone according to the first embodiment of the present invention.

FIG. 1 shows a portable telephone according to the first embodiment of the present invention. Referring to FIG. 1, a portable telephone 1 includes an earphone/microphone input terminal 3 to which an earphone/microphone 2 is attached, an earphone/microphone detection circuit 4 for detecting that the earphone/microphone 2 is attached to the earphone/microphone input terminal 3, a portable telephone circuit 5 to which the earphone/microphone detection circuit 4 is connected, and an antenna 6 connected to the portable telephone circuit 5.

The portable telephone circuit 5 is comprised of a control circuit 11 for receiving a detection output from the earphone/microphone detection circuit 4 and controlling the overall portable telephone 1, a data transmission circuit 12 for performing high-speed data communication under the control of the control circuit 11, a speech transmission circuit 13 for transmitting a speech signal under the control of the control circuit 11, a radio circuit 14 to which the data transmission circuit 12 and speech transmission circuit 13 are connected, and a keyboard 15 connected to the control circuit 11.

In the portable telephone 1 having the above arrangement, when the user generates a telephone conversation request by operating the keyboard 15, the control circuit 11 controls the speech transmission circuit 13 to set it in an active state in accordance with this telephone conversation request. When the user starts telephone conversation by using the portable telephone 1, speech from the user is transmitted to the other party through the following route: earphone/microphone 2→earphone/microphone input terminal 3→speech transmission circuit 13→radio circuit 14→antenna 6. Speech from the other party is transmitted to the user through the following route: antenna 6→radio circuit 14→speech transmission circuit 13→earphone/microphone input terminal 3→earphone/microphone 2.

When the user generates a data communication request by operating the keyboard 15, the control circuit 11 controls the data transmission circuit 12 to set it in an active state in accordance with this data communication request. As a consequence, transmission data is transmitted to the distant apparatus through the following route: data transmission circuit 12→radio circuit 14→antenna 6. Reception data from the distance apparatus is received through the following route: antenna 6→radio circuit 14→data transmission circuit 12, and stored in a memory (not shown).

As described above, the portable telephone 1 can selectively perform telephone conversation (speech communication) and data communication. The portable telephone 1 can also perform simultaneous communication (multi-call) of speech and data by using different radio communication channels.

The multi-call operation of the portable telephone 1 will be described next with reference to FIG. 1.

In response to a telephone conversation request or data communication request from the user, the control circuit 11 controls the speech transmission circuit 13 or data transmission circuit 12 to set it in an active state so as to set in a busy state (telephone conversation or data communication) (step S1).

The control circuit 11 then checks whether the busy state is caused by telephone conversation (speech communication) or data communication (step S2). If the busy state is caused by telephone conversation ("YES" in step S2), the control circuit 11 monitors a data communication request from the user (step S3). Upon detection of a data communication request, the control circuit 11 checks, on the basis of an output from the earphone/microphone detection circuit 4, whether the earphone/microphone 2 is attached to the earphone/microphone input terminal 3.

If the earphone/microphone 2 is attached to the earphone/microphone input terminal 3, the control circuit 11 controls the data transmission circuit 12 to set it in an active state (step S5). The control circuit 11 then controls the radio circuit 14 to start data communication by establishing a communication channel different from the communication channel used for speech communication (step S6). With this operation, the portable telephone is set in a multi-call communication state in which speech communication and data communication are simultaneously performed through two communication channels (step S7). If it is determined in step S4 that the earphone/microphone 2 is not attached, the control circuit 11 rejects the data communication request from the user. The flow then returns to step S1 to continue the telephone conversation.

Assume that the user generates a data communication request during telephone conversation. In this case, if the earphone/microphone 2 is attached, the control circuit 11 determines that the user is performing telephone conversation through the earphone/microphone 2. When the user performs telephone conversation trough the earphone/microphone 2, since the user is at some distance from the portable telephone 1 (antenna 6), the body portion (head or the like) of the user has little influence on the antenna 6. The control circuit 11 therefore determines that the transmission efficiency of the antenna 6 does not deteriorate when the user performs data communication under this condition, and permits data communication.

In the above case, if the earphone/microphone 2 is not attached, the control circuit 11 determines that the user is performing telephone conversation with his/her ear or mouth located near the receiver or microphone (not shown) of the portable telephone 1 without using the earphone/microphone 2. When the user performs telephone conversation through the receiver and microphone of the portable telephone 1, the user is located near the portable telephone 1 (antenna). For this reason, the body portion of the user has great influence on the antenna 6. The control circuit 11 therefore determines that the transmission efficiency of the antenna 6 will deteriorate when the user performs data communication under such a condition, and rejects data communication.

If it is determined in step S2 that data communication is being performed, the control circuit 11 monitors a telephone conversation request or data communication request from the user (steps S8 and S9). Upon detection of a telephone conversation request ("YES" in step S9), the control circuit 11 checks, on the basis of an output from the earphone/microphone detection circuit 4, whether the earphone/microphone 2 is attached to the earphone/microphone input terminal 3.

If the earphone/microphone 2 is attached, the control circuit 11 controls the speech transmission circuit 13 in an inactive state to set it in an active state (step S5). The control circuit 11 then controls the radio circuit 14 to start communication by establishing a communication channel different from the communication channel used for data communication (step S6). With this operation, the portable telephone is set in a multi-call communication state in which telephone conversation and data communication are simultaneously performed through two communication channels (step S7). If it is determined in step S4 that the earphone/microphone 2 is not attached, the control circuit 11 rejects the telephone conversation request from the user. The flow then returns to step S1 to continue the data communication.

Assume that the user generates a telephone conversation request during data communication. In this case, if the earphone/microphone 2 is attached, the control circuit 11 determines that the user will perform telephone conversation based on this telephone conversation request through the earphone/microphone 2. In this case, since the user is at some distance from the portable telephone 1, the head or the like of the user has little influence on the antenna 6. The control circuit 11 therefore determines that when data communication is performed under this condition, the transmission efficiency of the antenna 6 does not deteriorate and data communication is not influenced, and permits speech communication.

If it is determined in step S4 that the earphone/microphone 2 is not attached, the control circuit 11 determines that the user will perform telephone conversation with his/her ear or mouth located near the receiver or microphone (not shown) of the portable telephone 1 without using the earphone/microphone 2. In this case, since the user comes near to the portable telephone 1, the body portion of the user has great influence on the antenna 6. The control circuit 11 therefore determines that when telephone conversation is performed under such a condition, the transmission efficiency of the antenna 6 deteriorates and data communication is influenced, and rejects the telephone conversation request.

If a data communication request is determined in step S9, the control circuit 11 controls the radio circuit 14 to establish a communication channel different from the communication channel used for data communication so as to start new data communication by using the data transmission circuit 12 under operation. With this operation, the portable telephone is set in a multi-call communication state in which two data communications are simultaneously performed through two communication channels (step S7).

That is, since the body portion of the user is at some distance from the portable telephone 1 during data communication, the control circuit 11 determines that the transmission efficiency of the antenna 6 does not deteriorate. If, therefore, a new data communication request is received during data communication, this data communication request is permitted to perform different data communication through a new communication channel.

As described above, according to this embodiment, when a data communication request is generated during telephone conversation or a telephone conversation request is generated during data communication, permission/inhibition of the request is determined depending on whether the earphone/microphone 2 is attached to the portable telephone 1. If the earphone/microphone 2 is attached, it is assumed that the user will perform telephone conversation at some distance from the portable telephone 1. In this case, it is determined that the body portion of the user has little influence on the antenna 6 and the transmission efficiency of the antenna 6 does not deteriorate, and the request is permitted. With this operation, high-speed data communication can be performed without increasing the transmission power of the portable telephone 1, and high communication quality can be ensured.

If the earphone/microphone 2 is not attached when a request is received, it is assumed that the user will perform telephone conversation at a position near the portable telephone 1. In this case, it is determined that the body portion of the user has great influence on the antenna 6 and the transmission efficiency of the antenna 6 deteriorates, and the request is rejected. With this operation, since new telephone conversation is not performed during data communication, the quality of data communication under execution can be maintained high without increasing the transmission power of the portable telephone 1.

Figure 2:
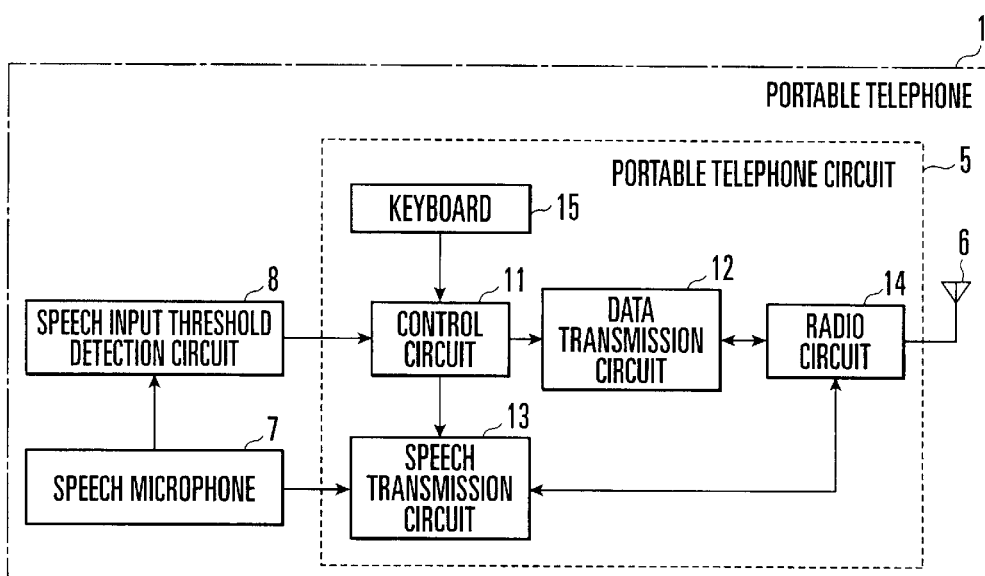
FIG. 2 is a block diagram showing a portable telephone according to the second embodiment of the present invention.

FIG. 2 shows a portable telephone according to the second embodiment of the present invention. A portable telephone 1 according to this embodiment has a speech microphone 7 for inputting speech and a speech input threshold detection circuit 8 in place of the earphone/microphone input terminal 3 and earphone/microphone detection circuit 4 in FIG. 1. The speech input threshold detection circuit 8 detects that user's speech from the speech microphone 7 has exceeded a predetermined threshold set in advance, and outputs a detection signal to a control circuit 11.

In this embodiment, if the speech input threshold detection circuit 8 detects that user's speech from the speech microphone 7 has exceeded the predetermined threshold, the control circuit 11 recognizes that the user is performing telephone conversation near the portable telephone 1. In this case, the control circuit 11 determines that the body portion of the user is located near the portable telephone 1 and the transmission efficiency of an antenna 6 has deteriorated, and rejects a data communication request during telephone conversation.

If the speech input threshold detection circuit 8 does not detect that user's speech from the speech microphone 7 has exceeded the predetermined threshold, the control circuit 11 recognizes that the user is performing telephone conversation at some distance from the portable telephone 1. In this case, the control circuit 11 determines that the body portion of the user is at some distance from the portable telephone 1 and the transmission efficiency of the antenna 6 has not deteriorated, and permits a data communication request during telephone conversation.

Figure 3:
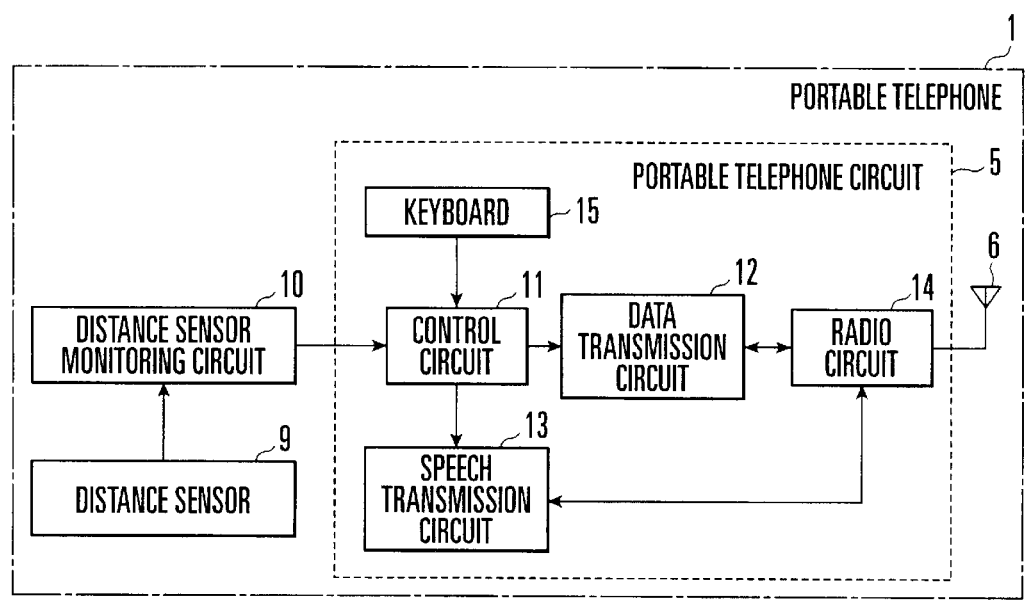
FIG. 3 is a block diagram showing a portable telephone according to the third embodiment of the present invention.
Figure 4:
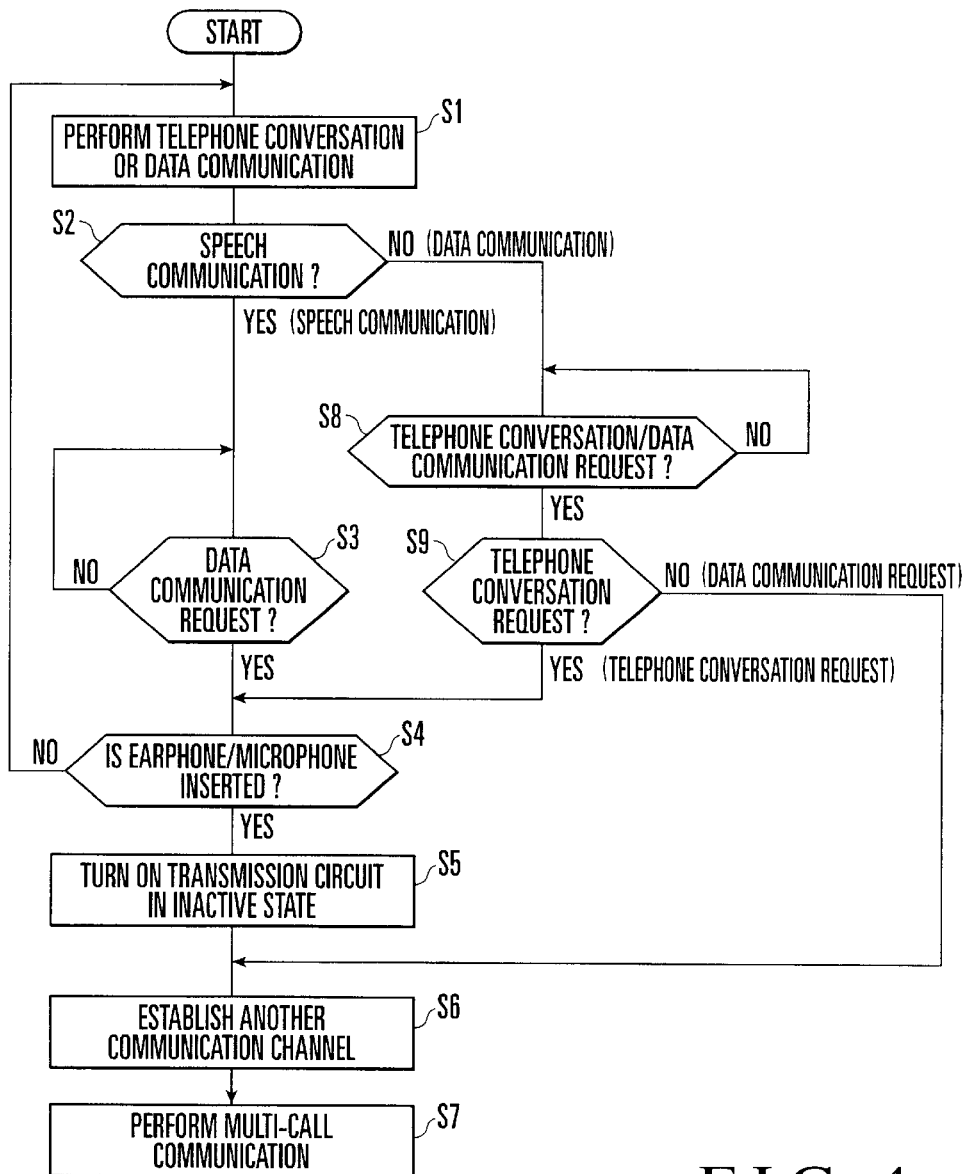
FIG. 4 is a flow chart showing multi-call operation of the portable telephone shown in FIG. 1.

FIG. 3 shows a portable telephone according to the third embodiment of the present invention. A portable telephone according to this embodiment has a distance sensor 9 for directly measuring the distance to the user and a distance sensor monitoring circuit 10 in place of the earphone/microphone input terminal 3 and earphone/microphone detection circuit 4 in FIG. 1. The distance sensor monitoring circuit 10 monitors the distance between the portable telephone 1 and the body portion of the user, which is directly measured by the distance sensor 9, and outputs, to a control circuit 11, a determination signal obtained by comparing the measured distance with a predetermined value set in advance.

In this embodiment, if a determination signal exhibiting a value equal to or less than a predetermined value is output from the distance sensor monitoring circuit 10, the control circuit 11 recognizes that the user is performing telephone conversation near the portable telephone 1. In this case, the control circuit 11 determines that the body portion of the user is located near the portable telephone 1 and the transmission efficiency of an antenna 6 has deteriorated, and rejects a data communication request during telephone conversation.

If a determination signal exhibiting a value exceeding the predetermined value is output from the distance sensor monitoring circuit 10, the control circuit 11 recognizes that the user is performing telephone conversation at some distance from the portable telephone 1. In this case, the control circuit 11 determines that the body portion of the user is at some distance from the portable telephone 1 and the transmission efficiency of the antenna 6 has not deteriorated, and permits a data communication request during telephone conversation.

As described above, the present invention restricts the execution of high-speed data communication during speech communication in a condition where an obstacle that degrades the transmission efficiency of the antenna 6 of the portable telephone 1 is located near the portable telephone 1, and permits data communication only when the obstacle is not present near the portable telephone 1, thereby realizing stable high-speed data communication without increasing the transmission power.

As has been described above, according to the present invention, when the transmission efficiency of the antenna deteriorates due to an obstacle near the antenna, a data communication request is rejected. This makes it possible to prevent an unnecessary increase in transmission power. When no obstacle is detected, data communication is permitted without any change. Therefore, stable high-speed data communication can be performed.

In addition, since the present invention has the earphone/microphone detection means or speech input threshold detection means, an obstacle that causes a deterioration in the transmission efficiency of the antenna can be indirectly detected.

Furthermore, since the present invention has the distance sensor monitoring means, an obstacle that causes a deterioration in the transmission efficiency of the antenna can be directly detected.

What is claimed is:

1. A portable telephone comprising:
   speech transmission means for performing speech communication through an antenna;
   data transmission means for performing data communication through the antenna simultaneously with speech communication by said speech transmission means;
   detection means for detecting an obstacle that causes a deterioration in transmission efficiency of said antenna; and
   control means for, when one of a data communication request during speech communication and a speech communication request during data communication is generated, determining on the basis of a detection result obtained by said detection means whether to permit/reject the request.

2. A telephone according to claim 1, wherein
   said portable telephone further comprises an earphone/microphone input terminal to which an earphone/microphone is attached, and
   said detection means comprises an earphone/microphone detection circuit for outputting a detection signal when the earphone/microphone is attached to said earphone/microphone input terminal.

3. A telephone according to claim 1, wherein
   said portable telephone further comprises a speech microphone for inputting speech, and
   said detection means comprises a speech input threshold detection circuit for outputting a detection signal when a level of a speech signal from said speech microphone exceeds a predetermined threshold.

4. A telephone according to claim 1, wherein
   said portable telephone further comprises a distance sensor for measuring a distance between a main body of said portable telephone and the user, and
   said detection means comprises a distance sensor monitoring circuit for outputting a detection signal when the distance measured by said distance sensor is not more than a predetermined value.

5. A telephone according to claim 1, further comprising radio means, when a request is permitted by said control means, simultaneously performing speech communication by said speech transmission means and data communication by said data transmission means through a plurality of communication channels.

6. A data communication control method for a portable telephone for simultaneously performing speech communication and data communication through an antenna, comprising the steps of:

detecting an obstacle that causes a deterioration in transmission efficiency of the antenna; and when one of a data communication request during speech communication and a speech communication request during data communication is generated, determining on the basis of an obstacle detection result whether to permit/reject the request.

7. A method according to claim 6, wherein the step of detecting comprises the step of detecting that an earphone/microphone is attached to an earphone/microphone input terminal.

8. A method according to claim 6, wherein the step of detecting comprises the step of detecting that a level of a speech signal from a speech microphone has exceeded a predetermined threshold.

9. A method according to claim 6, wherein the step of detecting comprises the step of detecting that a distance between a main body of the portable telephone and the user which is measured by a distance sensor is not more than a predetermined value.

10. A method according to claim 6, further comprising the step of simultaneously performing speech communication and data communication through a plurality of communication channels when a request is permitted.

* * * * *